United States Patent [19]
Geist

[11] Patent Number: 5,557,706
[45] Date of Patent: Sep. 17, 1996

[54] FLEXIBLE PRONUNCIATION-PRACTICE INTERFACE FOR RECORDER/PLAYER

[76] Inventor: Jon Geist, 4008 Fulford St., Olney, Md. 20832

[21] Appl. No.: 87,926

[22] Filed: Jul. 6, 1993

[51] Int. Cl.⁶ .................................................. G10L 3/00
[52] U.S. Cl. ...................... 395/2.81; 395/21; 395/279; 434/169; 369/10
[58] Field of Search .............................. 395/2, 2.87, 2.8, 395/2.79, 2.86, 2.81; 381/31; 434/169, 189, 308; 369/10

[56] References Cited

U.S. PATENT DOCUMENTS

| | | | |
|---|---|---|---|
| 3,323,230 | 6/1967 | Cooper | 434/320 |
| 4,380,438 | 4/1983 | Okamoto | 434/157 |
| 4,698,776 | 10/1987 | Shibata | 381/46 |
| 4,772,873 | 9/1988 | Duncan | 341/110 |
| 5,065,317 | 11/1991 | Hiramatsu et al. | 364/419 |
| 5,217,379 | 6/1993 | Kirschenbaum et al. | 434/236 |
| 5,393,236 | 2/1995 | Blackner et al. | 434/169 |

FOREIGN PATENT DOCUMENTS

| | | | |
|---|---|---|---|
| 294201A2 | of 1988 | European Pat. Off. | G09B 5/04 |
| 294202A2 | of 1988 | European Pat. Off. | G09B 5/04 |
| 478443A1 | of 1991 | European Pat. Off. | A63F 9/18 |
| 478443A | 9/1991 | European Pat. Off. | A63F 9/18 |
| 365981 | of 1991 | Japan | G09B 5/04 |

OTHER PUBLICATIONS

R. D. Tenny, Single–Chip Messaging System, in Radio Electronics p. 59 (1992).
Literature for Model VP620E a.k.a. Real Talk 316 From Antex Electronics, 16100 S. Figueroa St., Gardena, CA 90248.
Literature on Voice Master Key From Covox.
Literature on Sound Blaster From Creative Labs, 2050 Duane Ave., Santa Clara, CA 95054.
Literature on Digital Voice Modules From Ming Inc., 977 S. Meridian Ave., Alhambra, CA 91803.
Literature on VPC2000 From Votan, 4487 Technology Dr., Fremont, CA 94538.
Literature on Learn to Speak and Berlitz Think & Talk From Hyperglot, P.O. Box 10746, Knoxville, TN 37939–0746.

*Primary Examiner*—Allen R. MacDonald
*Assistant Examiner*—Richemond Dorvil

[57] ABSTRACT

An improved user interface and related control subsystem for a recorder/player for use in flexible-practice pronunciation training is described. The interface/control subsystem lets the user activate a single switch to initiate and complete any of the following activities any number of times and in any order: select the next sample sound; listen to the currently-selected sample sound; listen to the currently selected sample sound then record the user version of that sound; listen to the currently selected sample sound followed by the user version of that sound. Provision is also made for obtaining sample sounds from plug-in modules or by active recording with a means that is protected from inadvertent activation.

12 Claims, 3 Drawing Sheets

FLEXIBLE PRONUNCIATION-PRACTICE INTERFACE FOR RECORDER/PLAYER

BACKGROUND—FIELD OF INVENTION

This invention relates to devices that can record and play back speech, more specifically to those used for practicing and improving pronunciation.

BACKGROUND—THE PROBLEM

Good pronunciation is one of a number of problems associated with learning a language after puberty. Even language immersion, which is the best way to learn a language at any age is often not sufficient to eliminate the accent of speakers who otherwise have an excellent command of their new language. Many well educated immigrants who did not arrive in their new country until after the age of puberty retain a strong accent until their death. There are a number of reasons for this situation, but two are by far the most important. First, many people cannot really hear how they sound when they speak. Second, many people are too shy, afraid, or embarrassed to practice correct pronunciation in front of other people who could help them to correct their poor pronunciation.

To an extent that depends upon the particular country, a person's pronunciation of his native language identifies the person with a particular social status or class. People who have moved from one class to another for whatever reason, often wish to change their pronunciation to the norm of their new class. Many of these people encounter the same problems encountered by immigrants as they try to develop a pronunciation that is acceptable for their new status, and many never succeed.

Finally, actors and people in certain other professions want to modify their pronunciation to imitate specific accents for parts in movies or plays. Some actors are unable to develop realistic versions of the desired accents in the time available.

BACKGROUND—THE LTS AND LTL ACTIVITIES

There are two independent activities that most pronunciation students would like to be able to carry out as a major part of their pronunciation training. In the first activity, the student listens to a sample sound and then speaks (pronounces) it. This is the Listen Then Speak (LTS) activity. In the second, the student listens to a sample sound and then listens to his or her own pronunciation (version) of it. This is the Listen Then Listen (LTL) activity. The LTS activity can be carried out with the aid of a teacher whose pronunciation is to be imitated, but without any special equipment. Even so, most pronunciation students would rather carry out this activity in private with some type of recorder/player device rather than in the presence of a friend or teacher. Also, since most pronunciation students cannot hear how their own pronunciation sounds while speaking, the LTL activity usually requires some sort of recorder/player.

From the point of view of recorder/players, the LTS and LTL activities are realized by combining simpler record and play functions. However, from the point of view of a user trying to improve his or her pronunciation, the LTS and LTL activities are of interest, not the simpler record and play functions that are the basis of these activities. Any attention devoted to the simpler record and play functions when attempting to engage in the LTS and LTL activities is a burdensome distraction. For instance, having to press one or more switches in the middle of the LTL activity in order to complete the activity is, in itself, a distraction. Knowledge that pressing the wrong switch by mistake will destroy the very sound that the user wants to hear compounds this distraction with anxiety. Distractions of this type and their associated anxieties seriously reduce the effectiveness of a pronunciation training session.

Not only would many pronunciation students like to be able to participate in the LTS and LTL activities with a minimum of distractions and anxieties, they would also like to have a great deal of flexibility in deciding which activity to participate in at any given time during a training session. For example, suppose a user is having difficulty pronouncing his version of the sample sound in such a way as to make it sound like the actual sample sound. Also, suppose that he is having no problem hearing the difference between his version and the actual sample sound. He would probably want to carry out the LTS activity many times in a row, listening to the sample sound and then speaking his version of it, while trying to perfect his pronunciation of it. Only rarely would he feel that he had made enough progress to warrant using the LTL activity to listen to the sample sound followed by his version of it, hoping for an improvement in the latter.

On the other hand, suppose a user is having difficulty hearing the actual difference between her version of a sample sound and the actual sample sound. She will probably want to use the LTL function many times in a row to listen to the sample sound followed by her version of it over and over again. Only after repeated use of the LTL function will she use the LTS function, and then only once, to record a new version of the sample sound. Then she will probably again use the LTL function many times in row while trying to distinguish the difference between her version and the actual sample sound.

These examples represent the endpoints of a range of different ways that different users would like to be able to carry out the LTL and LTS activities at various times and with different sample sounds.

BACKGROUND—RELATED ART

The prior art contains many descriptions of different types of recorder/players and associated equipment that can be used to assist with the LTS and LTL pronunciation training activities. Some are specifically designed to aid in learning a language; others are general devices having many different applications.

CASSETTE AND TAPE PLAYERS

The most widely known of these is the conventional cassette or tape player with a language tape. This combines a minimal LTS activity with language instruction. The usual format is for the recorded voice of the instructor to introduce a new word by pronouncing it in the foreign language and giving its meaning in the user's native language, then to pronounce the word one or more times as a sample sound, pausing long enough after each time it is pronounced to let the user practice pronouncing the same word during the pauses. The problem with this approach is that the user cannot hear how his version of the word sounds, except while speaking it. Unfortunately, as pointed out in the preceding section, most people cannot actually hear how their pronunciation sounds to other people while they are speaking. Therefore, this approach does not help most people with the LTL activity.

A user can, in principle at least, operate a conventional cassette or tape player/recorder that has a microphone input in such a way as to assist in both the LTS and LTL activities. For instance, a user could record a series of sample sounds on a tape leaving spaces for her versions of them. Now suppose that she has just finished engaging in the LTL activity for some sample sound on the tape, and wishes to engage in the LTS activity for the same sample sound. She would have to carry out the following fairly elaborate and unforgiving series of steps:

1) Push the Rewind switch and watch the counter until it reaches the (previously noted) reading corresponding to the start of the sample sound;
2) Push the Stop switch to stop the rewinding;
3) Push the Play switch to listen to the sample sound;
4) Push the Stop switch to stop the playing;
5) Push the Record switch and speak into the microphone;
6) Push the Stop switch to stop the recording.

To carry out the LTL activity, she could then carry out the somewhat less elaborate steps:

1) Push the Rewind switch and watch the counter until it reaches the (previously noted) reading corresponding to start of the sample sound;
2) Push the Stop switch to stop the rewinding;
3) Push the Play switch to listen to the sample sound followed by her version of it (the user sound).

Of course, if she pushes the wrong switch at any point in this complex procedure, she fails to accomplish the desired activity, and may even record over one of the sounds she intended to save. Therefore, conventional tape players do not support the LTS and LTL activities in ways that are convenient for the pronunciation student, and in fact, create distraction and stress that interferes with the pronunciation training process.

OTHER RECORDER/PLAYERS

Many recorder/players that are in one way or another more convenient for pronunciation training have been described in the prior art specifically for language use. Some of these provide the user with a simple, non-distracting, non-anxiety provoking way to engage in pronunciation training sessions that consist of LTS or LTL activities that come at pre-programmed times and in pre-programmed order. Others offer more flexible control over the record and play functions and over access to the various memory areas from which to play or to which to record than do conventional tape recorders. None offer the user a pronunciation training interface that directly supports the LTS and LTL activities with the push of a single switch for each activity.

For instance, in U.S. Pat. No. 5,065,317, Hiramatsu describes an invention consisting of a plurality of training apparatuses, one for each student in a language class. Any single apparatus is of interest here. Each is provided with an audio input signal portion and an audio output signal portion, a voice data producing device for producing voice information data based on an input audio signal supplied through the audio signal input portion provided with each apparatus, and a voice memory device for storing the voice information data obtained from the voice data producing device in a storage area of the memory device as designated by address data. Further provided is an address data memory device for storing in storage areas thereof pairs of starting address data and terminating address data which designate respectively starting and terminating ends of each of the storage areas of the voice memory device in which the voice information data are stored. A memory controller is operative to read the pairs of starting address data and terminating address data successively from the storage areas of the address data memory device in response to a reproduction command signal sent out of one of the training apparatus and then to read the voice information data stored in the storage area of the voice memory device as designated by each of the pairs of starting address data and terminating address data read from the storage areas of the address data memory device. An audio signal supplying device produces an audio signal based on each of the voice information data read from the storage area of the voice memory device and supplies the audio signal output portion of one of the training apparatuses with the output audio signal produced based on the voice information data. Storing (memorizing) of audio signals works in a similar way with the obvious changes between recording a signal to the voice information storage areas for storage and reproduction of a signal from these areas for playback. The record and reproduction controls provided in the training apparatus are connected to supply a control unit with separate record command signals or reproduction command signals created in response to operations by students.

All of the description and claims of the above patent are written in terms of separate activities for recording and reproducing of audio signals, and no mention is made of single switch support for the LTS and LTL activities. Therefore, a user wishing to engage in the LTS activity after having selected the desired sample sound would have to carry out the following series of steps:

1) Push the Reproduce switch for the sample sound storage area and listen to the sample sound;
2) Push the Record switch for the user sound storage area and speak into the microphone;

To carry out the LTL activity, the user could then carry out the following steps:

1) Push the Reproduce switch for the sample storage area and listen to the sample sound.
2) Push the Reproduce switch for the user storage area and listen to the user sound.

This is a great improvement over the use of a tape recorder because the operations associated with the more stress producing LTS activity have been simplified considerably, but there are still two operations required for the single LTS activity, and two operations required for the single LTL activity.

A more pertinent example is described in Japanese patent number JA 0065981, TAPE RECORDER FOR PRACTICING LANGUAGE by Osawa. In this invention, a tape recorder is provided with two memory circuits, a first memory circuit for storing a sample sound recorded from a tape or cassette and a second memory circuit for storing a user sound recorded from microphone. By pressing a switch that Osawa calls the PRACTICE switch, the user can cause the device to play back the sound stored in the first memory followed by the sound stored in the second memory thereby engaging in the LTL activity. However, no similar provision is made for the LTS activity, so the user must still push two switches to participate in the single LTS activity.

Indeed, the previous art is full of variations of recorder-players optimized in various ways for use in language learning, but none of this art provides a means to treat each LTS and each LTL activity as a single, unified, independent activity by providing a new, more complex recorder function that is built up from simpler standard recorder/player functions and that can be started and completed by pushing a single switch one time to trigger a single LTS and by pushing a single switch one time to trigger a single LTL activity. Osawa comes the closest by providing such a switch for the LTL activity.

OBJECT, ADVANTAGES AND SUMMARY OF THE INVENTION

Accordingly, two objectives of the present invention are to provide recorder/players with a user interface for pronunciation training whereby (a) pressing a single switch, button, or key, etc. plays a sample sound and then records whatever sound is presented at the microphone;

(b) pressing a single switch, button, or key, etc. plays a sample sound and then plays whatever sound was last recorded during the recording period of (a) above.

The functions described in (a) and (b) above will be called the Play-sample-sound-Then-Record-user-sound (PTR) function and the Play-sample-sound-Then-Play-user-sound (PTP) functions, respectively. Provision of a single PTR function and a single PTP function, each of which can be initiated and completed with a single switch activation gives users of recorder/players the most natural and stress free way to engage in the LTS and LTL activities. The advantages of engaging in these activities in as natural a way as possible has been mentioned previously, but will be repeated here for completeness.

From the point of view of a user trying to improve his or her pronunciation, it is the LTS and LTL activities that are of interest. The record, play, and memory selection functions that are the basis of these activities are not of interest. Any requirement to devote attention to the record, play or memory selection functions when attempting to engage in the LTS and LTL activities is a serious distraction. For instance, having to press one or more switches in the middle of the LTL activity in order to complete the activity is, in itself, a distraction. Knowledge that pressing some of the wrong switches by mistake in the middle of the activity will destroy the very sound that the user wants to hear compounds this distraction with anxiety.

It is a further object of the present invention to improve recorder/players that allow the user to record sample sounds and that also provide a user interface satisfying the requirements of (a) and (b) above by adding to the user interface a means whereby (c) pressing a single switch, button, or key, etc., which is normally covered with a removable cover to protect it from inadvertent use, Records a new Sample Sound (RSS function). Of course, making provision for the user to record a sample sound has been widely anticipated in the prior art. In some cases the time during which the record button remains depressed determines the length of time each sample sound is recorded; in other cases, a fixed time period is allotted for recording each sample sound. However, there does not seem to be any mention of a protective cover in the prior art in either of these cases.

It is yet a further object of the present invention to improve the recorder/players described in (a) and (b) above by providing a user interface whereby (d) pressing a single switch, button, or key, etc. Plays a Sample Sound in isolation (PSS function). This provision, which has been widely anticipated in prior art recorder/players, is useful in combination with the PTP and PTR functions. Very shy people may want to Listen to a Sample Sound (LSS activity) without any other distractions many times before actually attempting to pronounce it. On the other hand, highly extroverted people will probably hardly ever engage in the LSS activity. Usually, they will prefer to either be recording or listening to their own voice in conjunction with the sample sound.

Finally, it is a further object of the present invention to improve recorder/players that store more than one sample sound at the same time and that also provide a user interface satisfying the requirements of (a) and (b) above by adding to the user interface a means whereby (e) pressing a single switch, button, or key, etc. selects the next sample sound according to an order determined when the sample sounds were recorded. This provision has also been anticipated in the prior art, but it, or some more complex sample sound selection means, is required with this type of recorder/player.

TYPICAL EMBODIMENT OF THE INVENTION

Assumptions about Recorder/Player

The minimum requirements for a recorder/player to support the PTR and PTP functions that are needed to make the LTS and LTL activities as effective and efficient as possible for flexible pronunciation practice are that it have 1) audio input and output means, 2) a user sound memory block and one or more sample sound memory blocks, all capable of storing coded versions of sounds, or a way to partition a memory means into such a user sound memory block and one or more such sample sound memory blocks;

3) a means for selecting among the sample sound memory blocks if there are more than one;

4) a means for selecting either the user sound memory block or the currently selected sample sound memory block;

5) a means for decoding and playing to the audio output means the sound corresponding to the signal stored in the currently selected memory block;

6) a means for encoding and storing whatever sound is present at the audio input means into the user memory block.

7) a means for encoding and storing whatever sound is present at the audio input means into the currently selected sample memory block, or a means for inserting and removing sample memory blocks on which sample sounds have been pre-recorded.

Both the public domain and the patent prior art give a wide variety of options with which to meet these requirements, and commercial devices meeting these requirements are available. Anyone skilled in the art to which this invention pertains will be able to fill in the details for the recorder/player technology or implementation of his or her choice, and will be able to make the minor modifications to the user interface described below to make it work with that particular technology or implementation. For convenience in exposition, the simple term play will be used to describe the process of decoding the signal stored in a memory block and playing the decoded version to the audio output means. Similarly, the simple term record will be used to describe the process of encoding a sound present at the audio input means and storing the encoded signal in a memory block until the memory block is full.

Figure 1:
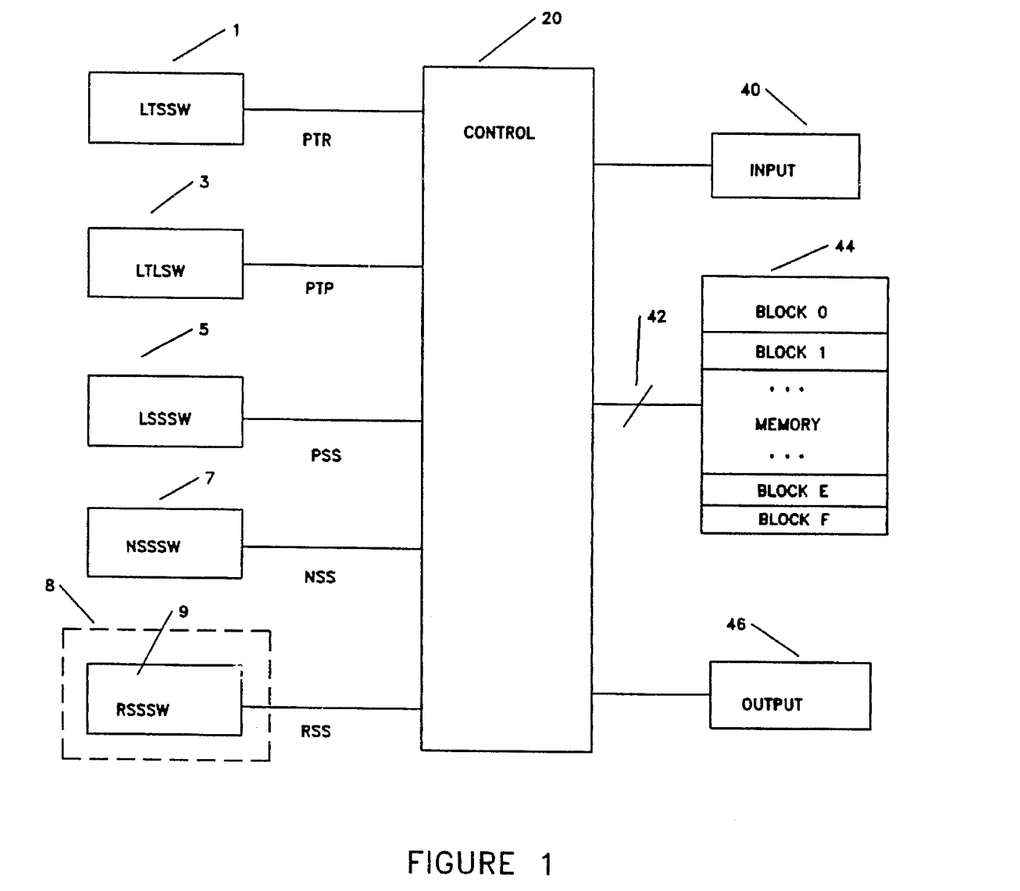
FIG. 1 shows a typical recorder/player having the Flexible-Practice Pronunciation-Training User Interface of this invention.
Figure 2:
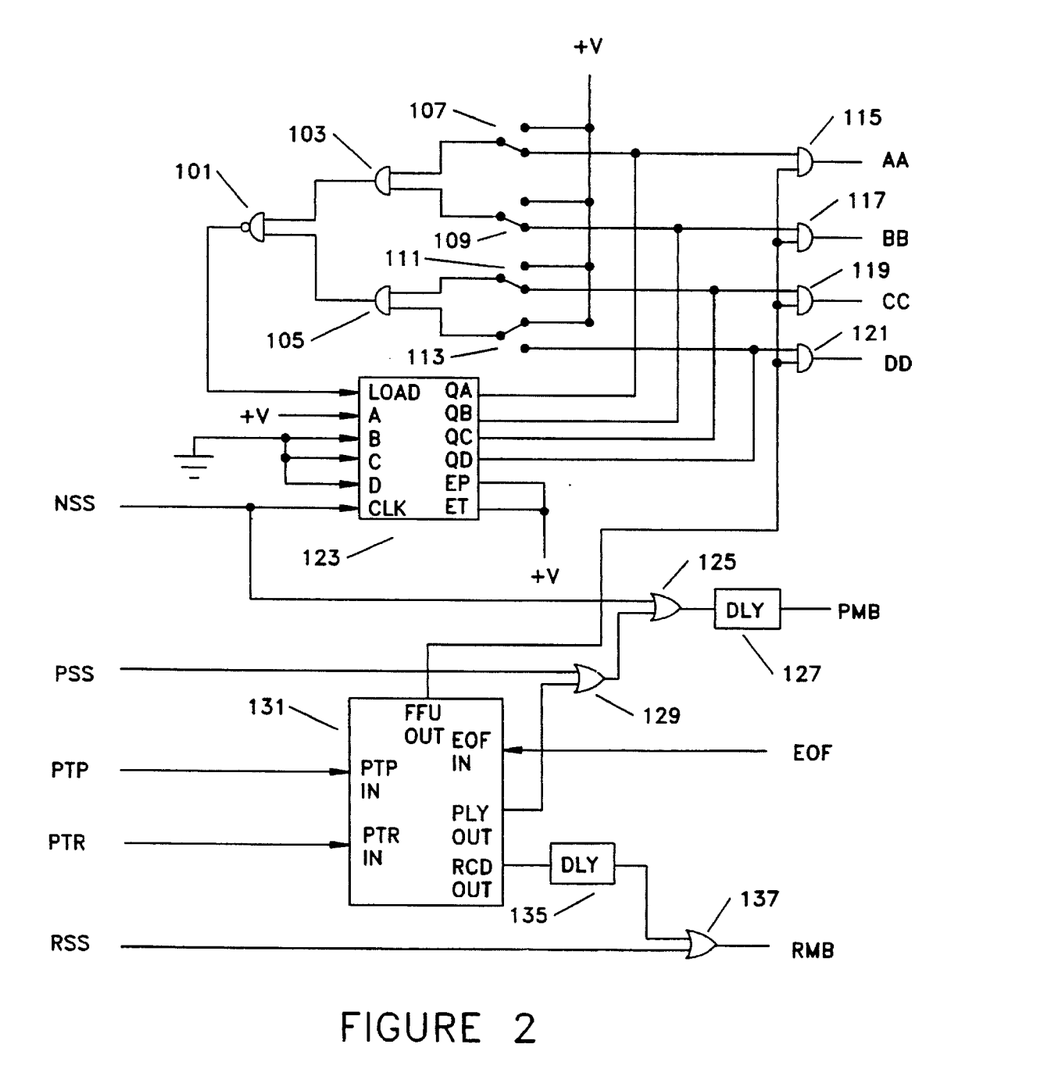
FIG. 2 shows the portions of the control system of a typical recorder/player that supports Flexible-Practice Pronunciation Training.
Figure 3:
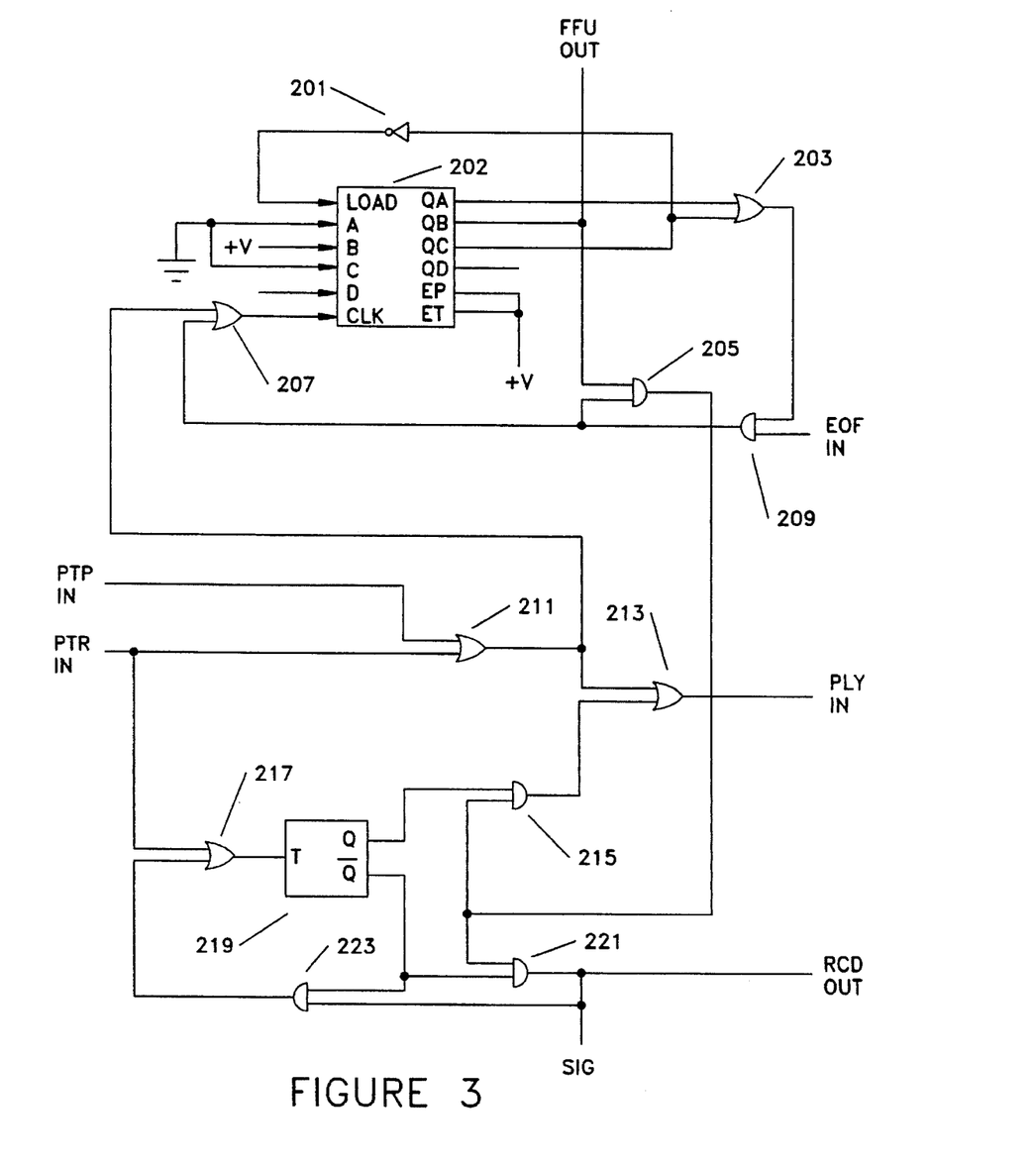
FIG. 3 shows the detail s of a subsystem of the control system shown in FIG. 2.

DETAILED DESCRIPTIONS—FIGS. 1 THROUGH 3

Detailed Description of FIG. 1

FIG. 1 shows a recorder/player consisting of a CONTROL means (20), a switch means LTSSW (1) connected by a line PTR to CONTROL means (20), a switch means LTLSW (3) connected by a line PTP to CONTROL means (20), a switch means LSSSW (5) connected by a line PSS to CONTROL means (20), a switch means NSSSW (7) connected by a line NSS to CONTROL means (20), a switch means RSSSW (9) covered by a removable or retractable cover (8) and connected by a line RSS to CONTROL means (20), an audio INPUT means (40) connected to CONTROL means (20), an audio OUTPUT means (46) connected to CONTROL means (20), and a memory means MEMORY (44) connected by a bus (42) to CONTROL means (20).

LTSSW represents the Listen-to-sample-sound-Then-speak-user-sound SWitch, while PTR represents the Play-sample-sound-Then-Record-user-sound complex of basic recorder/player functions. LTLSW represents the Listen-to-sample-sound-Then-listen-to-user-sound SWitch, while PTP represents the Play-sample-sound-Then-Play-user-sound complex of basic recorder/player functions. LSSSW represents the Listen-to-Sample-Sound SWitch, while PSS represents Play-Sample-Sound recorder/player function. NSSSW represents the Next-Sample-Sound Switch, while NSS represents the select next-Sample-Sound-address recorder/player function. RSSSW represents the Record-Sample-Sound SWitch, while RSS represents the Record-Sample-Sound recorder/player function.

The recorder/player shown in FIG. 1 has a memory means MEMORY (44) that is partitioned into sixteen memory blocks that are addressed by a binary coded signal on four lines of address bus (42). Memory block BLOCK 0 is selected when the signal on bus (42) corresponds to the binary number 0000 (0 Hex). This memory block is used as the user memory block. The remaining fifteen memory blocks, BLOCK 1 (hex) through BLOCK F (hex), are used as fifteen sample memory blocks, and are addressed by corresponding binary-coded signals 0001 through 1111 on bus (42).

To make the description of the typical embodiment even more concrete, it is assumed that CONTROL means (20) has four address lines AA, BB, CC, and DD on bus (42) that determine which memory block is currently selected by the binary coded signal on those lines. When all four lines are low, BLOCK 0, the user memory block is selected. Otherwise, BLOCK N, the Nth sample memory block is selected, where N is the binary number coded on lines AA, BB, CC, and DD, with AA coding the low-order bit.

It is further assumed that CONTROL means (20) has internal lines Play-Memory-Block (PMB), Record-Memory-Block (RMB), and End-Of-Function (EOF) that are normally in the logic 0 state. A high-going pulse on the PMB line triggers the player/recorder to play to audio OUTPUT means (46) the entire contents of the currently selected memory block. Similarly, a high-going pulse on the RMB line triggers the player/recorder to record from audio OUTPUT means (40) to the currently selected memory block until that block is full. It is further assumed that CONTROL means (20) puts a suitably short and clean, high-going pulse on the EOF line whenever it has completed playing from or recording to the currently selected memory block.

It is also assumed that switch means (1), (3), (5), (7), and (9) contain the circuitry necessary to generate suitably short and clean, high-going pulses when activated. It is further assumed that these switch means contain circuitry to prevent them from generating any pulses between the time that switch means (5), (7), or (9) has been activated and one pulse has appeared on the EOF line. In a similar vein, it is assumed that switch means (1), (3), (5), (7), and (9) are prevented from generating any pulses between the time that switches means (1) or (3) has been activated and two pulses have appeared on the EOF line. Anyone skilled in the art of digital electronics can design such switch means.

Detailed Description of FIG. 2

FIG. 2 shows the portion of CONTROL means (20) governing the interaction of the flexible-practice pronunciation-training user-interface lines PTR, PTP, PSS, NSS, and RSS with the basic recorder/player function lines PMB, EOF, RMB, DD, CC, BB, and AA. The circuit of FIG. 2 consists of two loosely coupled subsystems, one in the upper part of the figure, the other in the lower part of the figure.

The heart of the top subsystem in FIG. 2 is a presettable counter (123), which is shown as a 74161 digital integrated circuit. For this circuit, 1) preset (reset) occurs on the next high-going CLK pulse after LOAD goes low when the enables EP and ET are held high, and 2) when preset occurs, the binary count encoded on the output bits QA, QB, QC, and QD is set to the count encoded on the corresponding data input bits A, B, C, and D, respectively. Anyone skilled in the art of digital electronics could replace the 74161 circuit with a suitable circuit design providing the subset of the 74161 functions being used here.

The heart of the lower subsystem in FIG. 2 is circuit (131), which is shown in detail in FIG. 3, and which converts single activations of switch means (1) and (3) in FIG. 1 into different combinations of the three basic recorder/player functions: Play from Memory Block (PMB), Record to Memory Block (RMB), and Select Memory Block (SMB).

The NSS line from switch means (7) in FIG. 1 drives the CLK input to counter (123). As is shown in FIG. 2, the QA, QB, QC, and QD outputs of counter (123) each drive one input of four AND gates (115), (117), (119), and (121), which drive the AA, BB, CC, and DD memory address lines, respectively. The other inputs to these four gates are connected to the FFU OUT line of circuit 131. The QA, QB, QC, and QD lines of counter 123 each also feed one input of four switches (107), (109), (111), and (113), respectively, while the other inputs to these switches are connected to the circuit high voltage +v (logic level 1). The outputs of switches (107) and (109) are combined in an AND gate (103) while the outputs of switches (111) and (113) are combined in an AND gate (105). The outputs of AND gates (103) and (105) are combined in a NAND gate (101), whose output drives the LOAD input of counter (123). The data inputs A, B, C, and D of counter (123) are hard-wired to encode the binary number 0001.

Any combination of settings on switches 107 through 113 can be used except 0000; 0000 would assign one of the sample memory blocks to the same block, BLOCK 0, as the user memory block thereby conflicting with one of the design goals of the invention. Of course, more address lines in parallel with AA, BB, CC, and DD, more switches in parallel with 107 through 113 and more AND gates in suitable serial parallel combinations with 103 and 105 can be added to accommodate more sample memory blocks if the recorder/player being used has more than sixteen memory blocks, and more than fifteen sample memory blocks are desired. Similarly, less address lines, switches and gates can be used if desired.

In recorder/players having means to adjust the number and size of the memory blocks within the constraints imposed by the total size of MEMORY means 44 in FIG. 1, switches 107 through 113 in FIG. 2 could be brought out to the user interface portion of the apparatus and also be coupled to the adjustment means. Anyone ordinarily skilled in the field of this invention could do this in such a way that the settings on these switches would determine both the number and size of the user and sample memory blocks consistent with the total size of MEMORY means 44. Otherwise, switches 103 through 113 could be internal switches as shown. They could also be hard wired, or even completely absent.

The NSS line from switch means (7) in FIG. 1 also drives one input of an OR gate (125) in the lower subsystem in FIG. 2. The other input to OR gate (125) comes from the output of an OR gate (129). One input to OR gate (129) comes from the PSS line connected to switch means (5) in FIG. 1. The other input to OR gate (129) comes from the PLY OUT line of circuit (131). The output of OR gate (125) drives a delay circuit DLY (127), which in turn drives the PMB line of CONTROL means (20).

The RCD OUT line from circuit (131) drives a delay circuit DLY (135), which in turn drives one input of an OR gate (137). The other input to OR gate (137) comes from the RSS line that is connected to switch means (9) in FIG. 1. The output of OR gate (137) drives the RMB line of CONTROL means (20).

Still referring to FIG. 2, circuit (131) has three input lines: the PTP line coming from switch means (3) in FIG. 1, the PTR line coming from switch means (1) in FIG. 1, and the EOF IN line of CONTROL means (20).

DETAILED DESCRIPTION OF FIG. 3

FIG. 3 shows the details of circuit (131) of FIG. 2. This circuit consists of a presettable counter circuit (202), with the QA output going to one input of an OR gate (203), with the QB output going to the line FFU OUT line of circuit (131) in FIG. 2, with the QC output going to a NOT gate (201) and to the other input of OR gate (203), and with the QD output not used. The output of NOT gate (201) drives the LOAD input of counter (202). The data input lines A, B, and C of counter (202) are hard wired to encode the binary number 010. As was the case with counter (123) of FIG. 2, counter (202) is also based on a model 74161 presettable counter. Again, any circuit design providing the subset of the 74161 functions being used here could replace the 74161.

The output of OR gate (203) drives one input of an AND gate (209), with the other input for this AND gate coming from the EOF IN line of circuit (131) in FIG. 2. The output of AND gate (209) drives one input to an AND gate (205) and one input to an OR gate (207). The FFU OUT line of circuit (131) in FIG. 2 is the other input to AND gate (205), while the output from an OR gate (211) is the other input to OR gate (207). The output of OR gate (211) also drives an OR gate (213), which in turn drives the PLY OUT line of circuit (131) in FIG. 2. One input to OR gate (211) is the PTP IN line of circuit (131) in FIG. 2. The other input comes from the PTR IN line of the same circuit. This line also drives one input of an OR gate (217), whose output drives the toggle input of a toggle flip-flop (219). The other input to OR gate (217) is an AND gate (223) with one input coming from the Q-bar output of flip-flop (219) and the other from the output of an AND gate (221). The normal state of flip-flop (219) has the Q output high and the Q-bar output low.

The output of AND gate (221) also drives the RCD OUT line of circuit 131 in FIG. 2, and the SIG line shown only in FIG. 3. The other input to AND gate (221) is the output of AND gate (205), which output also is one input to an AND gate (215). The other input to AND gate (215) is the Q output of flip-flop (219), and the output of AND gate (215) is the other input to OR gate (213). The SIG line in FIG. 3 can be used to trigger an audio or visual signal to alert the user that the Listen-to-sample-sound portion of the LTS activity is complete and that the Then-Record-user-sound portion is about to begin.

Operation of a Flexible Practice Pronunciation Trainer

The switch means LSSSW (5), RSSSW (9), NSSSW (7), LTLSW (3), and LTSSW (1) in FIG. 1 trigger combinations of recorder/player functions that support the following flexible-practice pronunciation-training activities, respectively:

1) the Listen-to-Sample-Sound (LSS) activity, 2) the Record-Sample-Sound (RSS) activity, 3) the select Next-Sample-Sound (NSS) activity, 4) the Listen-to-sample-sound-Then-Listen-to-user-sound (LTL) activity, and 5) the Listen-to-sample-sound-Then-Speak-user-sound (LTS) activity.

The first two activities each require only one recorder/player function, the Play Sample Sound (PSS) and Record Sample Sound (RSS) functions, respectively. The remaining three require combinations of recorder/player functions.

Except during the LTL and LTS activities, the FFU line from circuit (131) in FIG. 2 is always high. Therefore, memory address lines AA, BB, CC, and DD normally encode the count stored on output lines QA, QB, QC, and QD in counter (123) in FIG. 2. These counts are restricted to the set [1, 2, . . . K], where K<10 (hex)=16 is the count encoded by the switches (107), (109), (111), and (113) in FIG. 2. Also, notice that K=1000 (binary)=8 in FIG. 2. Thus, except during one phase of the LTL and LTS activities when the FFU line is brought low, address lines AA, BB, CC, and DD select one of the sample memory blocks BLOCK 1 through BLOCK 8 in FIG. 1. As mentioned previously, when the FFU line is brought low, then address lines AA, BB, CC and DD select BLOCK 0, which is the user memory block.

LSS Activity

When switch means LSSSW (5) in FIG. 1 is activated, a high-going pulse appears on the PSS line in FIG. 2. From there it is passed by OR gates (129) and (125) through delay circuit (127) to the PMB line where it triggers the recorder/player to play to audio OUTPUT means (46) in FIG. 1 the currently selected sample sound, that is, the contents of the currently selected memory block, one of BLOCK 1 through BLOCK 8.

Thus a user can activate switch means LSSSW (5) any time she wishes to hear the currently selected sample sound.

RSS Activity

When switch means RSSSW (9) in FIG. 1 is activated, a high-going pulse appears on the RSS line in FIG. 2. From there it is passed by OR gate (137) to the RMB line where it triggers the recorder/player to record whatever audio signal is presented at audio INPUT means (40) in FIG. 1 into the currently selected sample memory block until that block is full.

Thus a user can activate switch means RSSSW (9) any time he wishes to record a new sample sound into the currently selected sample memory block.

NSS Activity

Suppose that the count encoded on memory address lines AA, BB, CC, and DD in FIG. 2 is N, corresponding to the address of memory BLOCK N in FIG. 1. Now, when switch means NSSSW (7) in FIG. 1 is activated, a high-going pulse appears on the NSS line in FIG. 2. From there it directed through OR gate (125) and delay circuit DLY (127) to the PMB line where it triggers the recorder/player to play the contents of the currently selected sample memory block.

The pulse on the NSS line is also directed to the CLK input of counter (123) in FIG. 2 to select a new sample memory block. The only purpose of delay circuit (127) is to allow sufficient time for counter (123) to select the new sample memory address before replay starts; it is not needed in recorder/players that already have sufficient delay between presentation of a pulse on the PMB line and the actual start of the play function.

If the LOAD input to counter (123) is high when the pulse appears at the CLK input to counter (123), then the count encoded on counter output lines QA, QB, QC, and QD is incremented to N+i, and if the LOAD input is low due to the count encoded on lines QA, QB, QC, and QD being equal to the maximum count set on switches (107), (109), (111), and (113), then the count encoded on QA, QB, QC, and QD is reset to 0001 binary, which is the count encoded on data input lines A, B, C, and D. Since, as already mentioned, the FFU line from circuit (131) in FIG. 2 is normally high, the memory block address lines, AA, BB, CC, and DD will normally encode the address encoded on lines QA, QB, QC, and QD.

In other words, activation of switch means NSSSW (7) in FIG. 1 selects the next sample memory block following the currently selected sample memory block [where BLOCK 1 follows BLOCK K, and K is the number encoded on switches (107), (109), (111), and (113)], and then plays the contents of the newly selected sample memory block. As already mentioned, K=1000 (binary)=8 for the case illustrated in FIG. 2.

Thus a user can activate switch means NSSSW (7) any time she wishes to select the next sample sound, that is, the sample sound stored in the next sample memory block according to the cyclic order in which the sample memory blocks are addressed.

LTL Activity when switch means LTLSW (3) in FIG. 1 is activated, a high-going pulse appears on the PTP line in FIG. 2. From there it is directed to the PTP input of circuit (131) in FIG. 2. From there it is directed through OR gates (211) and (207) to the CLK input of counter (202) in FIG. 3, and through OR gates (211) and (213) in FIG. 3 to the PLY OUT output line of special circuit (131) of FIG. 2.

when it reaches the CLK input to counter (202) in FIG. 3, the pulse at the PTP IN line causes counter (202) to increment the count encoded on output lines QA, QB, QC, and QD from the preset value of 0010 binary to a count of 0011 binary. Since QB remains high, the FFU line and the input to AND gate (205) connected to it also remain high. On the other hand, the QA input to AND gate (209), which had formerly been low thereby preventing any high-going pulses on the EOF line from getting into the circuit of FIG. 3, is now high.

When the pulse on the PTP IN line reaches the PLY OUT line in FIG. 3, it passes through OR gates (129) and (125) in FIG. 2, and through delay circuit (127) to the PMB line where it triggers the recorder/player to play the contents of the currently selected sample memory block.

When CONTROL (20) puts a high-going pulse on the EOF line in FIG. 2 to signal that the recorder/player is finished playing the contents of the currently selected sample memory block, the pulse is directed to the EOF IN input to special circuit (131) in FIG. 3 where it passes AND gate (209) and OR gate (207) to the CLK input of counter (202). Here it causes counter (202) to advance the count encoded on output lines QA, QB, and QC from 011 binary to 100 binary. Since the QB line is now low, the FFU line and the input to AND gate (205) that is connected to it are now also low. However, one input to OR gate (203) is still high because QC is high, so AND gate (209) will still pass a high-going pulse to OR gate (207).

Before it could go low, AND gate (205) had already passed the pulse from the EOF IN line to AND gates (215) and (221). Because the Q output of flip-flop (219) is normally high, AND gate (215) passes the pulse through OR gate (213) to the PLY OUT line of circuit (131) in FIG. 2. From the PLY OUT output of circuit (131) the pulse passes through OR gates (129) and (125) through delay circuit (127) in FIG. 2 to the PMB line where it triggers the recorder/player to play the contents of the currently selected memory block, which, since the FFU line is low, is the user memory block, BLOCK 0.

Also, the LOAD input to counter (202) is now low because QC is high. Therefore, when CONTROL (20) puts a high-going pulse on the EOF line in FIG. 2 to signal that the recorder/player is finished playing the contents of the user memory block, that pulse is directed to the EOF IN input to circuit (131) where it passes AND gate (209) through OR gate (207) to the CLK input of counter (202). Here it causes counter (202) to preset to 0010 binary, which puts circuit (131) of FIG. 2 back into the state it was before switch means LTLSW (3) was activated.

Thus a user can activate switch means LTLSW (3) any time he wishes to listen to the sample sound followed by the user sound, where the user sound is whatever was recorded to the user memory block during the most recent LTS activity as described next.

Notice that it essential that the EOF line return to the low state before QB goes high again in order to prevent a spurious high-going pulse from being generated by AND gate (205) when QB does go high. This constraint determines the maximum duration of the EOF pulse unless a delay circuit is used, for instance on the FFU line input to AND gate (205).

LTS Activity

When switch means LTSSW (1) in FIG. 1 is activated, a high-going pulse appears on the PTR line in FIG. 2 and is input to OR gate (211), so the circuit behaves in essentially the same way as during the LTL activity, with one major exception. The fact that the pulse on the PTR IN line passes through OR gate (217) to change the state of flip-flop (219) means that the EOF pulse that signals the end of playing the sample sound goes through AND gate (221) instead of AND gate (215). From there it passes to the RCD OUT line of circuit (131) in FIG. 2 through OR gate (137) to the RMB line where it triggers the recorder/player to record whatever audio signal is presented at audio INPUT (40) in FIG. 1 until BLOCK 0, the user memory block, is full. This pulse also passes through AND gates (221) and (223), and OR gate (217) to the toggle input of flip-flop (219) where it resets flip-flop (219) to its original (Q high) state.

Thus a user can activate a switch means LTSSW (1) any time she wishes to listen to the sample sound and then record her version of it as the user sound.

Circuitry is needed to preset counters (123) and (207) in FIGS. 2 and 3, respectively, and to set the toggle flip-flop in FIG. 3 to have Q high when the recorder/player is turned on, or when an optional master-reset switch is pushed. This circuitry is not shown because anyone skilled in digital electronics can design such circuitry.

SUMMARY, RAMIFICATIONS, AND SCOPE

Accordingly, the reader can see that the user interface of this invention gives the user maximum flexibility in the desired pronunciation training activities while minimizing the attention that the user needs to direct to the recorder/player being used in the pronunciation training effort. Specifically, it allows the user to initiate and complete with single activations of various switch means any of the following pronunciation training activities any number of times and in any order:

Listen to Sample Sound (LSS);

select Next Sample Sound (NSS);

Record Sample Sound (RSS);

Listen to sample sound Then Listen to user sound (LTL);

Listen to sample sound Then Speak user sound (LTS).

Although the description above contains many specifications, these should not be construed as limiting the scope of the invention but as merely providing illustrations of a typical embodiment of this invention. Thus the scope of the invention should be determined by the appended claims and their legal equivalents, rather than by the examples given.

What is claimed is:

1. An audio recorder/player apparatus comprising:

(a) user memory means for storing user sound signals;

(b) sample memory means for storing sample sound signals;

(c) audio input means for recording said user sound signals into said user memory means;

(d) audio output means for playing said user sound signals stored in said user memory means and for playing said sample sound signals stored in said sample memory means;

(e) control means for directing and coordinating the operations of said user memory means, said sample memory means, said audio input means, and said audio output means;

(f) a first user-activatable switch means for triggering, with a single activation, said control means to cause said audio output means to play said sample sound signals stored in said sample memory means and, when playing of said sample sound signals is complete, to cause said audio input means to record said user sound signals into said user memory means;

(g) a second user-activatable switch means for triggering, with a single activation, said control means to cause said audio output means to play said sample sound signals stored in said sample memory means and, when playing of said sample sound signals is complete, to cause said audio output means to play said user sound signals stored in said user memory.

2. The audio recorder/player apparatus of claim 1 wherein (a) said audio output means plays all of said sample sound signals stored in said sample memory means when directed by said control means following activation of said first user-activatable switch means;

(b) said audio output means plays all of said sample sound signals stored in said sample memory means when directed by said control means following activation of said second user-activatable switch means.

3. The recorder/player apparatus of claim 1 wherein (a) said sample memory means comprises a plurality of separate memory blocks each capable of storing separate sample sound signals;

(b) said audio output means selectively plays all of said sample sound signals stored in one of said plurality of separate sample memory blocks when directed by said control means following activation of said first user-activatable switch means;

(c) said audio output means selectively plays all of said sample sound signals stored in one of said plurality of separate sample memory blocks when directed by said control means following activation of said second user-activatable switch means.

4. The audio recorder/player apparatus of claim 1 wherein the apparatus includes a third user-activatable switch means not already recited, and wherein said control means, following activation by said third user-activatable switch means, causes said audio input means to record said sample sound signals into said sample memory means.

5. The audio recorder/player apparatus of claim 4 wherein the apparatus includes a protective cover for said third user-activatable switch means that is selected from the group consisting of retractable covers and removable covers to prevent inadvertent activation of said third user-activatable switch means.

6. The audio recorder/player apparatus of claim 4 wherein said control means, when triggered by said third user-activatable switch means, causes said audio input means to record said sample sound signals into said sample memory means during such time as said third user-activatable switch means remains activated or until said sample memory means is full, which ever occurs first.

7. The audio recorder/player apparatus of claim 4 wherein said sample memory means comprises a plurality of separate memory blocks each capable of storing separate sound signals, and said control means, when triggered by said third user-activatable switch means, causes said audio input means to record whatever sound is present at said audio input means into one of said plurality of separate memory blocks during such time as said third user-activatable switch means remains activated or until said one of said plurality of separate memory blocks is full, which ever occurs first.

8. The audio recorder/player apparatus of claim 1 wherein said first user-activatable switch means and said second user-activatable switch means are dedicated to activating the functions described in claim 11 and cannot be reprogrammed for any other application.

9. The audio recorder/player apparatus of claim 1 wherein said apparatus fits into a user's hand in such a way that said first user-activatable switch means and said second user-activatable switch means can be easily and reliably activated without looking at the apparatus.

10. The audio recorder/player apparatus of claim 1 wherein said sample memory means can be inserted into and removed from said apparatus while preserving said sample sound signals stored in said sample memory means.

11. The audio recorder/player apparatus of claim 1 wherein said control means generates an audio or a visual signal before causing said audio input means to start to record into said user memory means following activation of said first user-activatable switch means.

12. The audio recorder/player apparatus of claim 11 wherein
  (a) said user memory means and said sample memory means are selected from the group of memory means consisting of digital-address/digital-data memory, digital-address/analog-data memory, analog-address/digital-data memory, and analog-address/analog-data memory, and combinations from said group of memory means;
  (b) said user memory means and said sample memory means are selected from the group of memory means consisting of electronic memory, magnetic memory, and combinations from said group of memory means;
  (c) said audio input means are selected from the group of input means consisting of tape recorders, microphones, electronic recorders, and combinations from said group of audio input means;
  (d) said audio output means are selected from the group of output means consisting of headphones, speakers, and combinations from said group of audio output means;
  (e) said first and second switch means are selected from the group of switch means consisting of single switches, push button switches, key strokes on a keyboard, key strokes on a keypad, and combinations from said group of switch means;
  (f) said control means are selected from the group of control means consisting of software, microprocessors, micro-controllers, integrated circuits, circuits with discreet components, and combinations from said group of control means.

* * * * *